(12) United States Patent
Asakura et al.

(10) Patent No.: US 8,593,800 B2
(45) Date of Patent: Nov. 26, 2013

(54) ELECTRONIC EQUIPMENT WITH HINGE MECHANISM

(75) Inventors: Hirofumi Asakura, Osaka (JP); Jun Sato, Osaka (JP); Isao Shimada, Hyogo (JP)

(73) Assignee: Panasonic Corporation, Osaka (JP)

( * ) Notice: Subject to any disclaimer, the term of this patent is extended or adjusted under 35 U.S.C. 154(b) by 183 days.

(21) Appl. No.: 12/913,331

(22) Filed: Oct. 27, 2010

(65) Prior Publication Data

US 2011/0102986 A1   May 5, 2011

(30) Foreign Application Priority Data

Nov. 5, 2009   (JP) .................. 2009-254146

(51) Int. Cl.
- *G06F 1/16* (2006.01)
- *H05K 5/00* (2006.01)
- *H05K 7/00* (2006.01)
- *E05D 7/04* (2006.01)
- *E05D 15/00* (2006.01)

(52) U.S. Cl.
USPC ............................ 361/679.28; 16/235; 16/362

(58) Field of Classification Search
USPC ................. 361/679.26–679.3; 16/235, 362
See application file for complete search history.

(56) References Cited

U.S. PATENT DOCUMENTS

| 4,864,523 | A | * | 9/1989 | Sasaki | 361/679.09 |
|---|---|---|---|---|---|
| 4,959,887 | A | * | 10/1990 | Gruenberg et al. | 16/223 |
| 4,986,763 | A | * | 1/1991 | Boyle | 439/165 |
| 5,001,659 | A | * | 3/1991 | Watabe | 361/679.28 |
| 5,237,488 | A | * | 8/1993 | Moser et al. | 361/679.28 |
| 5,390,075 | A | * | 2/1995 | English et al. | 361/679.28 |
| 5,394,297 | A | * | 2/1995 | Toedter | 361/679.28 |
| 5,581,440 | A | * | 12/1996 | Toedter | 361/679.28 |
| 5,796,576 | A | * | 8/1998 | Kim | 361/679.28 |
| 5,827,082 | A | * | 10/1998 | Laine | 439/165 |
| 6,091,601 | A | * | 7/2000 | Schlesener et al. | 361/679.28 |
| 6,223,393 | B1 | * | 5/2001 | Knopf | 16/366 |
| 6,359,776 | B2 | * | 3/2002 | Carlson | 361/679.28 |
| 6,488,517 | B1 | * | 12/2002 | Williams et al. | 439/165 |
| 6,692,275 | B2 | * | 2/2004 | Lee | 439/165 |
| 6,976,799 | B2 | * | 12/2005 | Kim et al. | 400/472 |
| 7,474,525 | B2 | * | 1/2009 | Watanabe et al. | 361/679.28 |

(Continued)

FOREIGN PATENT DOCUMENTS

| JP | 5-046561 | | 2/1993 | | |
|---|---|---|---|---|---|
| JP | 06077670 | A * | 3/1994 | ............... | H05K 5/02 |

(Continued)

*Primary Examiner* — Adrian S Wilson

(74) *Attorney, Agent, or Firm* — Hamre, Schumann, Mueller & Larson, P.C.

(57) ABSTRACT

In the electronic equipment of the present application, a center axis of a cylindrical portion 11a of a shaft 11 is eccentric with respect to a rotation center axis of the shaft 11, whereby even when a cable 21 comes closest to the shaft 11 in the turning of a first housing 1 or second housing 2, a sufficient space can be secured between the shaft 11 and the cable 21. Thus, in a turning range of the first housing 1 or second housing 2, it is highly unlikely that the shaft 11 and the cable 21 come into contact with each other, which avoids an increase in a tension of the cable 21 and wear on an insulation cover of the cable 21. By avoiding the increase in the tension of the cable 21, breakage of the electric wires in the cable 21 can be avoided.

6 Claims, 12 Drawing Sheets

(56) References Cited

U.S. PATENT DOCUMENTS

| | | | |
|---|---|---|---|
| 7,787,242 B2 * | 8/2010 | Schwager et al. | 361/679.28 |
| 7,848,094 B2 * | 12/2010 | Wang et al. | 361/679.28 |
| 7,898,815 B2 * | 3/2011 | Tanaka et al. | 361/749 |
| 7,974,085 B2 * | 7/2011 | Ouyang | 361/679.27 |
| 2001/0009499 A1 * | 7/2001 | Carlson | 361/683 |
| 2006/0152893 A1 * | 7/2006 | Chen | 361/681 |
| 2006/0176652 A1 * | 8/2006 | Lin et al. | 361/679 |
| 2010/0088853 A1 * | 4/2010 | Degner et al. | 16/342 |

FOREIGN PATENT DOCUMENTS

| | | |
|---|---|---|
| JP | 6-152491 | 5/1994 |
| JP | 6-310874 | 11/1994 |
| JP | 2003-018263 | 1/2003 |
| JP | 2003-049823 | 2/2003 |

* cited by examiner

ELECTRONIC EQUIPMENT WITH HINGE MECHANISM

BACKGROUND

1. Field

The present application relates to electronic equipment with a hinge mechanism.

2. Description of Related Art

Conventionally, electronic equipment with a hinge mechanism includes a notebook computer, a foldable mobile telephone, a portable game player, and the like. In such electronic equipment, each of two housings coupled rotatably by the hinge mechanism contains electric components such as an electric circuit board. For example, as for the notebook computer, a first housing contains a motherboard, etc., and a second housing contains a liquid crystal display, etc. The electric components in the first housing and the second housing often are connected electrically by a cable. At this time, the cable often is routed near the hinge mechanism.

However, when the cable is routed near the hinge mechanism, the cable may be disconnected due to the turning movement of the first housing and the second housing.

JP 2003-049823 A discloses a configuration in which, in a rotary hinge mechanism supporting a main body part and rotation part of the electronic equipment, a through hole is provided at a position eccentric from a rotation center axis for improving the degree of freedom in design of the electric wire routing.

JP 2003-018263 A discloses a configuration in which, in a mobile telephone having a first and second housings and a hinge portion, a means for regulating a shift range of a cable is provided for avoiding disconnection of the cable.

JP 06-310874 A discloses a configuration in which, in foldable electronic equipment having two housings and a hinge portion, a blind sheet is provided for preventing disconnection of a wiring pattern.

JP 05-046561 A discloses a configuration in which, in electronic equipment having a main body, cover and hinge, improvements are made for preventing disconnection, etc.

JP 06-152491 A discloses a configuration in which, in a foldable mobile telephone, improvements are made for preventing disconnection of the cable.

In the conventional art, the tension of the cable increases when the second housing is closed with respect to the first housing, which sometimes results in the cable disconnection.

For suppressing the increase in the tension of the cable, there is a method in which the cable is made longer. However, when the cable is made long, it loosens greatly inside the housing when the second housing is in an open state with respect to the first housing. Accordingly, a space for arranging the loosened cable is required in the housing or near the hinge mechanism, which inhibits the downsizing of the electronic equipment. Especially, in the compact electronic equipment such as a mobile telephone terminal, since a space for the cable route is narrow, it is difficult to allocate a space for arranging the loosened cable.

SUMMARY

The electronic equipment of the present application includes: a first housing and a second housing respectively provided with electric components; a hinge portion that supports the first housing and the second housing rotatably and has a hinge center axis; and a signal line that connects the electric components provided in each of the first housing and the second housing electrically. The hinge portion has a shaft for supporting the first housing and the second housing, the signal line is disposed so that at least a part thereof is positioned near a cylindrical surface of the shaft, and when the second housing is turned, a distance changes between a predetermined point on an outer surface of the first housing and the cylindrical surface of the shaft.

DETAILED DESCRIPTION OF THE EMBODIMENT

The electronic equipment according to the present embodiment includes: a first housing and a second housing respectively provided with electric components; a hinge portion that supports the first housing and the second housing rotatably and has a hinge center axis; and a signal line that connects the electric components provided in each of the first housing and the second housing electrically. The hinge portion has a shaft for supporting the first housing and the second housing, the signal line is disposed so that at least a part thereof is positioned near a cylindrical surface of the shaft, and when the second housing is turned, a distance changes between a predetermined point on an outer surface of the first housing and the cylindrical surface of the shaft.

In the electronic equipment according to the present embodiment, it is possible that a part of a center axis of the shaft opposed to the signal line is eccentric with respect to the hinge center axis, and the cylindrical surface is separated from the signal line when the first housing and the second housing are in a closed state in an open/close movement about the hinge portion.

In the electronic equipment according to the present embodiment, it is possible that the cylindrical surface of the shaft has a notched face so as not to cause a tension on the signal line when the first housing and the second housing are in the closed state in the open/close movement about the hinge portion.

In the electronic equipment according to the present embodiment, it is possible that the cylindrical surface of the shaft has a notched face so as to allocate a space between the cylindrical surface and the signal line when the first housing and the second housing are in the closed state in the open/close movement about the hinge portion.

In the electronic equipment according to the present embodiment, it is possible that, in a part of the shaft near the signal line, the center axis is disposed at a position opposed to the signal line, with the hinge center axis sandwiched therebetween.

(Embodiment)

[1. Configuration of Electronic Equipment]

Figure 1A:
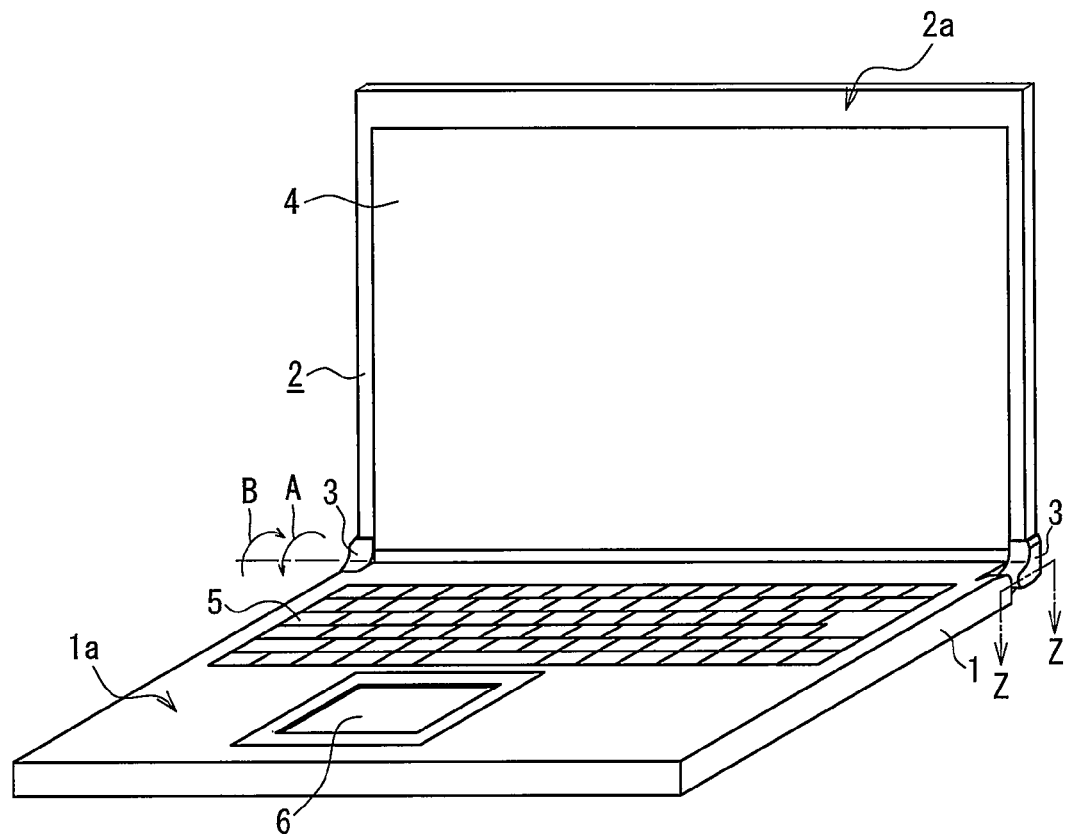
FIG. 1A shows a perspective view of a notebook computer as an example of electronic equipment according to Embodiment (first state).
Figure 1B:
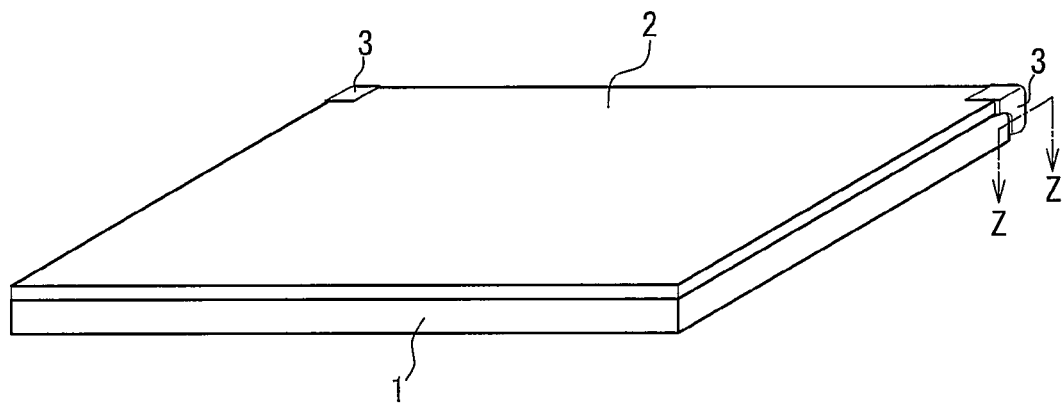
FIG. 1B shows a perspective view of the notebook computer as an example of electronic equipment according to Embodiment (second state).

FIGS. 1a and 113 are perspective views showing an appearance of a notebook computer as an example of electronic equipment according to the present embodiment. FIG. 1A shows the notebook computer in a first state. FIG. 1B shows the notebook computer in a second state. Note here that in the present embodiment the notebook computer is given as an example of the electronic equipment, but the equipment is not limited hereto as long as it at least includes a plurality of housings, a hinge mechanism supporting the plurality of housings rotatably, and a signal line connecting electric components contained in the plurality of housings electrically. Such equipment as a foldable mobile telephone terminal, a foldable electronic game player, a foldable electronic dictionary terminal, and the like are further examples.

As shown in FIG. 1A, the notebook computer includes a first housing 1 and a second housing 2. The first housing 1 contains a hard disk drive, a circuit board on which various electric elements are mounted, and the like. The second housing 2 includes a display device 4 (e.g., liquid crystal display). The first housing 1 and the second housing 2 are supported rotatably by hinge portions 3. The hinge portions 3 have a shaft for supporting the first housing 1 and the second housing 2 rotatably. Note here that the detailed configuration of the hinge portion 3 will be described later. A keyboard 5 and a pointing device 6 are provided on an upper face 1a of the first housing 1. The keyboard 5 receives an input operation of various characters by a user. The pointing device 6 is fixed in the first housing 1, and an operation surface thereof is exposed on a front face of the first housing 1. The pointing device 6 is capable of receiving a contact operation by the user on the operation surface and moving a cursor displayed on the display device 4 to a desired position. Note here that the upper face 1a of the first housing 1 is a face opposed to the second housing 2 when the notebook computer is in the second state shown in FIG. 1B.

Generally, when the notebook computer is used, the second housing 2 is turned from the second state shown in FIG. 1B in a direction indicated by an arrow B so that the computer is shifted to the first state shown in FIG. 1A. When the notebook computer is closed, the second housing 2 is turned from the first state shown in FIG. 1A in a direction indicated by an arrow A so that the computer is shifted to the second state shown in FIG. 1B. In the first state, the display device 4 can be seen, that is, the notebook computer is in general use. In the second state, the second housing 2 is folded with respect to the first housing 1, that is, the notebook computer is not in use for carrying or the like.

[2. Configuration of the Hinge Portion 3]

First, a schematic configuration of the hinge portion 3 will be described.

Figure 2A:
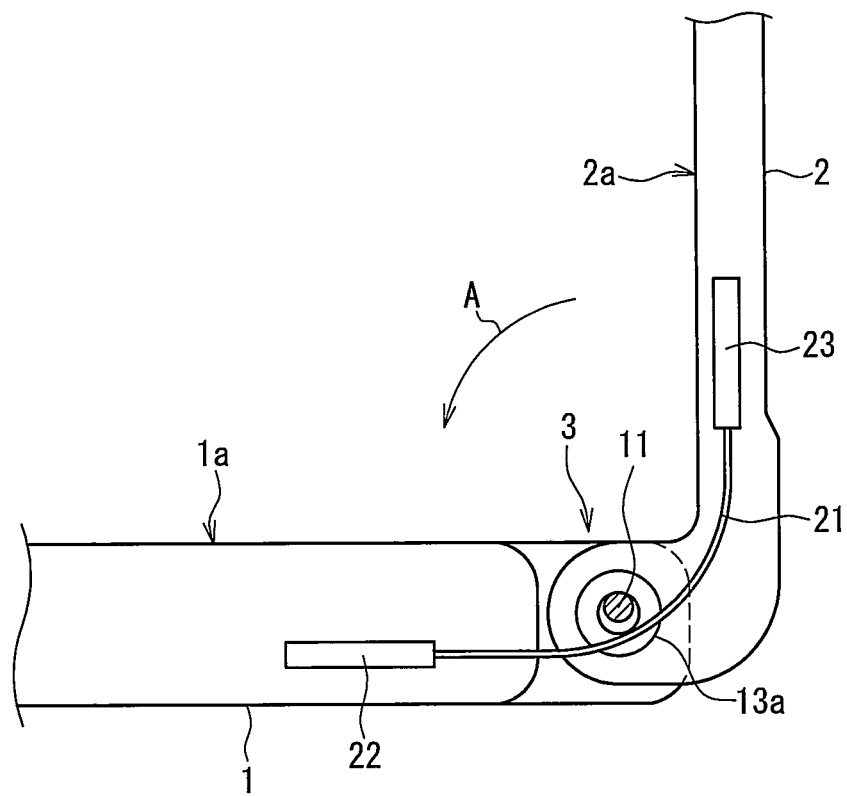
FIG. 2A is a schematic diagram showing an internal configuration of a hinge portion (first state).
Figure 2B:
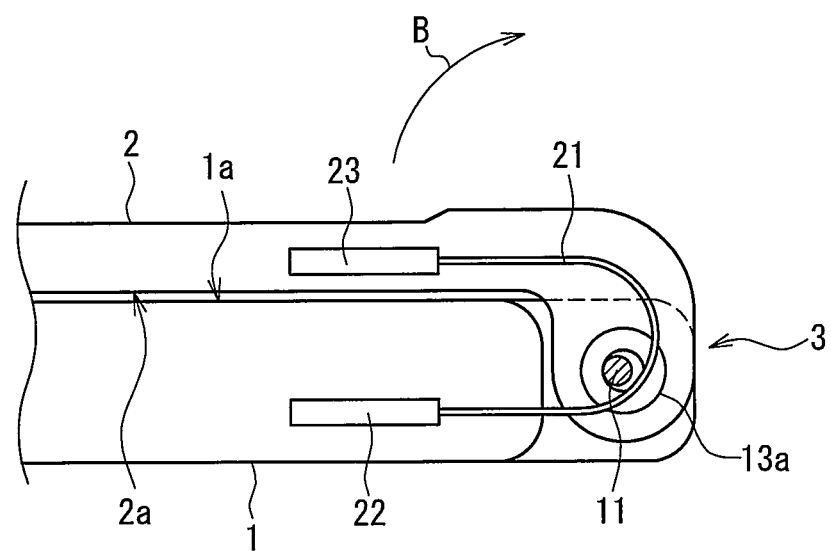
FIG. 2B is a schematic diagram showing the internal configuration of the hinge portion (second state).

FIGS. 2A and 2B are schematic diagrams showing a configuration of the hinge portion according to the present embodiment. FIG. 2A schematically shows a cross-section taken along a line Z-Z in FIG. 1A. FIG. 2B schematically shows a cross-section taken along a line Z-Z in FIG. 1B. Note here that only a shaft 11 is illustrated cross-sectionally with hatching, and the other portions are illustrated schematically for clarification of the drawings.

As shown in FIGS. 2A and 2B, the hinge portion 3 has the shaft 11. The shaft 11 has a substantially cylindrical shape, and some generatrices forming the cylindrical surface are curved. Further, an end portion of the shaft 11 in a longitudinal direction is supported rotatably on the first housing 1 side, and the other end portion thereof is fixed on the second housing 2 side. Further, turning the first housing 1 or the second housing 2 rotates the shaft 11, with the shaft direction serving as a direction of the rotation center axis. Further, as described above, since some generatrices forming the cylindrical surface are curved, a center axis of a cylindrical portion 11a (see FIG. 3A) is eccentric with respect to the rotation center axis of the shaft 11. Therefore, when the second housing 2 is in the first state shown in FIG. 2A, the cylindrical portion 11a of the shaft 11 is located eccentrically in a direction substantially orthogonal to the upper face 1a from the rotation center axis. When the second housing 2 is in the second state shown in FIG. 2B, the cylindrical portion 11a of the shaft 11 is located eccentrically in a plane direction of the upper face 1a from the rotation center axis. That is, in the second state shown in FIG. 2B, the cylindrical portion 11a of the shaft 11 is displaced in a direction away from the cable 21, with respect to the rotation center axis of the shaft 11.

A first connecter 22 is contained in the first housing 1, and mounted on an electric circuit board (not shown) disposed in the first housing 1. A second connector 23 is contained in the second housing 2, and connected electrically to a drive circuit (not shown) of the display device 4 disposed in the second housing 2. An end portion of the cable 21 is connected to the first connecter 22, and the other end portion thereof is connected to the second connector 23. That is, the cable 21 connects the first connecter 22 and the second connector 23 electrically.

As shown in FIG. 2A, when the notebook computer is in the first state, the curve of the cable 21 is small since, the first connecter 22 and the second connector 23 are located as illustrated. Therefore, a sufficient space is present between the cable 21 and the shaft 11. When the second housing 2 is turned from the first state shown in FIG. 2A in the direction indicated by the arrow A for shifting the computer to the second state shown in FIG. 2B, a part of the cable 21 positioned near the shaft 11 curves and comes closer to the cylindrical portion 11a of the shaft 11. At this time, in a configuration in which the position of the shaft 11 does not change between the first state and the second state, the space between the shaft 11 and the cable 21 becomes small and they are highly likely to come into contact with each other. However, in the present embodiment, since the cylindrical portion 11a of the shaft 11 is eccentric with respect to the rotation center axis, the cylindrical portion 11a is positioned farther from the cable 21 in the second state, whereby the space between the shaft 11 and the cable 21 is widened. Thus, it is possible to prevent the cable 21 from contacting with the shaft 11.

Hereinafter, a specific configuration of the hinge portion 3 will be described.

Figure 3A:
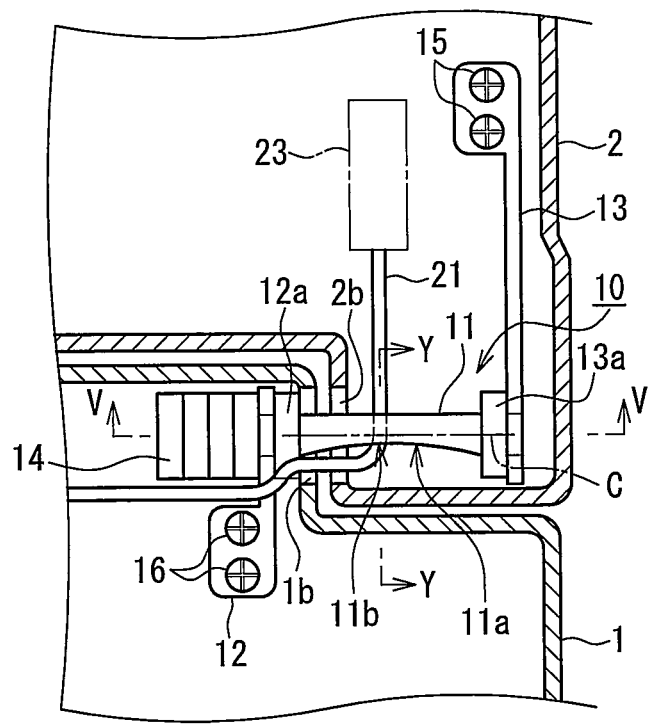
FIG. 3A is a plan view showing the internal configuration of the hinge portion.
Figure 3B:
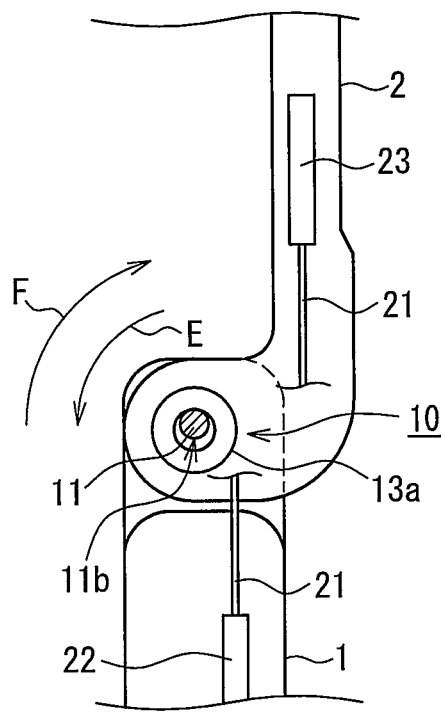
FIG. 3B is a schematic diagram showing the internal configuration of the hinge portion.
Figure 4A:
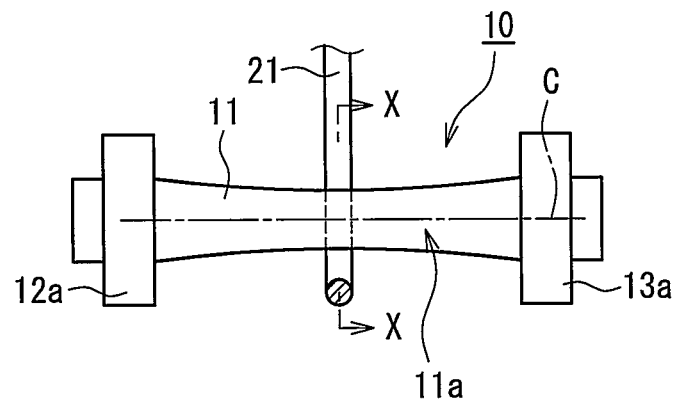
FIG. 4A is a cross-sectional view of a shaft and a cable.
Figure 4B:
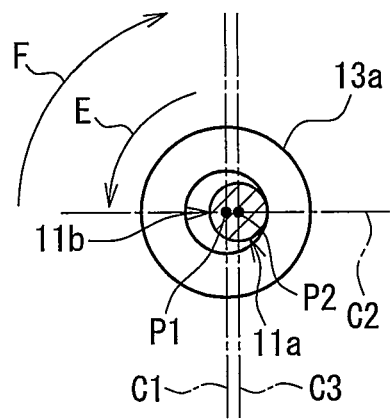
FIG. 4B is a cross-sectional view taken along a line X-X in FIG. 4A.

FIG. 3A is a main-portion plan view showing an internal configuration of the hinge portion 3. Note here that in FIG. 3A, parts of the first housing 1 and the second housing 2 are illustrated cross-sectionally for clarification of the drawing. Further, for convenience in explanation of FIG. 3A, the second housing 2 is turned further from the first state (see FIG. 1A) in the direction indicated by the arrow B, so as to be in an about 180-degree open state with respect to the first housing 1. FIG. 3B is a cross-sectional view taken along a line Y-Y in FIG. 3A. Note here that in FIG. 3B, only the shaft 11 is illustrated cross-sectionally with hatching and the other portions are illustrated schematically for clarification of the drawings. FIG. 4A is a side view showing the shaft 11 and the peripheral mechanism, taken along a line V-V in FIG. 3A. In FIG. 4A, only the cable 21 is illustrated cross-sectionally. FIG. 4B is a cross-sectional view taken along a line X-X in FIG. 4A.

As shown in FIG. 3A, the hinge portion 3 includes a hinge mechanism 10. The hinge mechanism 10 has the shaft 11, a first support member 12, a second support member 13, and a torque mechanism 14.

The shaft 11 is rotatable about a line segment C in FIG. 4A in a direction indicated by an arrow E or F (see FIG. 3B or 4B). The cylindrical portion 11a of the shaft 11 is eccentric with respect to the rotation center axis of the shaft 11 (line segment C). Specifically, in FIG. 4B, a line segment that passes through an intersection P1 of line segments C1 and C2 and that is orthogonal to the line segments C1 and C2 is a center axis of a first support portion 12a and a second support portion 13a (described later) as well as the rotation center axis of the shaft 11 (i.e., coincides with the line segment C). A line segment that passes through an intersection P2 of line segments C2 and C3 and that is orthogonal to the line segments C2 and C3 is the center axis in the cylindrical portion 11a of the shaft 11. As shown in FIG. 4B, the positions of the intersections P1 and P2 do not coincide with each other, and the center axis of the cylindrical portion 11a of the shaft 11 (intersection P2) is eccentric with respect to the rotation center axis of the shaft 11 (intersection P1). Therefore, when the shaft 11 is rotated in the direction indicated by the arrow E or F, the rotation center axis (intersection P1) is not displaced but the center axis (intersection P2) is displaced around the rotation center axis (intersection P1). Further, at a part where the center axis of the cylindrical portion 11a (intersection P2) and the rotation center axis of the shaft 11 (intersection P1) are the most distant from each other, that is, at the most recessed part of the shaft 11 with respect to the rotation center axis C when viewed from an angle shown in FIG. 3A (hereinafter, referred to as a deepest portion 11b), the shaft 11 crosses the cable 21. When the second housing 2 is rotated, a distance between a predetermined point on an outer surface of the first housing 1 and the cylindrical surface of the shaft changes. Note here that, taking into consideration the resistance against a force to be generated in the turning of the first housing 1 or the second housing 2, the shaft 11 preferably is made of metal. The shaft 11 in the present embodiment is made of stainless, having a shaft diameter of about 3-4 mm and a shaft length of about 15 mm, but the dimension and the material are not limited hereto.

The first support member 12 is connected rotatably to the shaft 11, and fixed to the first housing 1 by screws 16. The second support member 13 is fixed to the shaft 11 by rivets or the like, and fixed to the second housing 2 by screws 15. Therefore, by turning the second housing 2 between the first state (see FIG. 1A) and the second state (see FIG. 1B), the shaft 11 rotates integrally with the second housing 2, and the second support member 13 turns integrally with the second housing 2 about the shaft 11. Further, the first support member 12 is provided with the first support portion 12a integrally. The first support portion 12a has a through hole into which the shaft 11 is inserted rotatably. The second support member 13 is provided with the second support portion 13a integrally. The second support portion 13a has a through hole into which the shaft 11 can be inserted. The shaft 11 is inserted into the through hole of the second support portion 13a and fixed to the second support portion 13a by rivets or the like. The first support portion 12a and the second support portion 13a are formed in a substantially cylindrical shape as shown in FIGS. 3A-4B. The center of the first support portion 12a and the second support portion 13a (intersection of the line segments C1 and C2) when viewed from the direction shown by FIG. 4B is the rotation center axis of the first support portion 12a and the second support portion 13a, and at the same time, it is the rotation center axis of the shaft 11. Note here that in the present embodiment, as shown in FIGS. 3B and 4B, only the second support portion 13a side is illustrated, but the first support portion 12a side has the same configuration. Further, taking into consideration the resistance against a force to be generated in the turning of the first housing 1 or the second housing 2, the first support member 12 and the second support member 13 preferably are made of metal. In the present embodiment, they are made of stainless an example, but are not limited hereto.

The torque mechanism 14 is composed of a plurality of disk-shaped washers, a rubber sheet or the like, and fixed to the shaft 11. In the present embodiment, the washers and rubber sheet have a through hole into which the shaft 11 can be inserted, whereby the shaft 11 is inserted into the through hole and fixed by press-fitting. Therefore, when the shaft 11 rotates along with the turning of the second housing 2, the torque mechanism 14 rotates together with the shaft 11. Further, the torque mechanism 14 is pressed against the first support member 12, whereby a rotation load is given to the second housing 2 by friction at a part contacting the first support member 12. Further, the position of the second housing 2 can be maintained at an arbitrary angle with respect to the first housing 1 by friction between the first support member 12 and the torque mechanism 14. For example, the position of the first state shown in FIG. 1A can be maintained. Note here that the configuration of the torque mechanism 14 in the present embodiment is an example, and another configuration may be adopted as long as it at least provides a load with respect to the rotation of the shaft 11 or the turning of the second housing 2.

The cable 21 in the present embodiment may be a coaxial cable in which electric wires are covered by an insulation cover, and sends a display signal generated in a signal processing circuit in the first housing 1 to the display device 4. The cable 21 is drawn out from the first connecter 22, inserted into an aperture 1b formed in the first housing 1 and an aperture 2b formed in the second housing 2, drawn to a circumferential direction of the shaft 11 along a side face of the cylindrical portion 11a of the shaft 11, and connected to the second connector 23.

Hereinafter, the turning movement of the first housing 1 or the second housing 2 will be described. The present embodiment exemplarily describes a movement when the second housing 2 is turned without changing the position of the first housing 1.

Figure 5A:
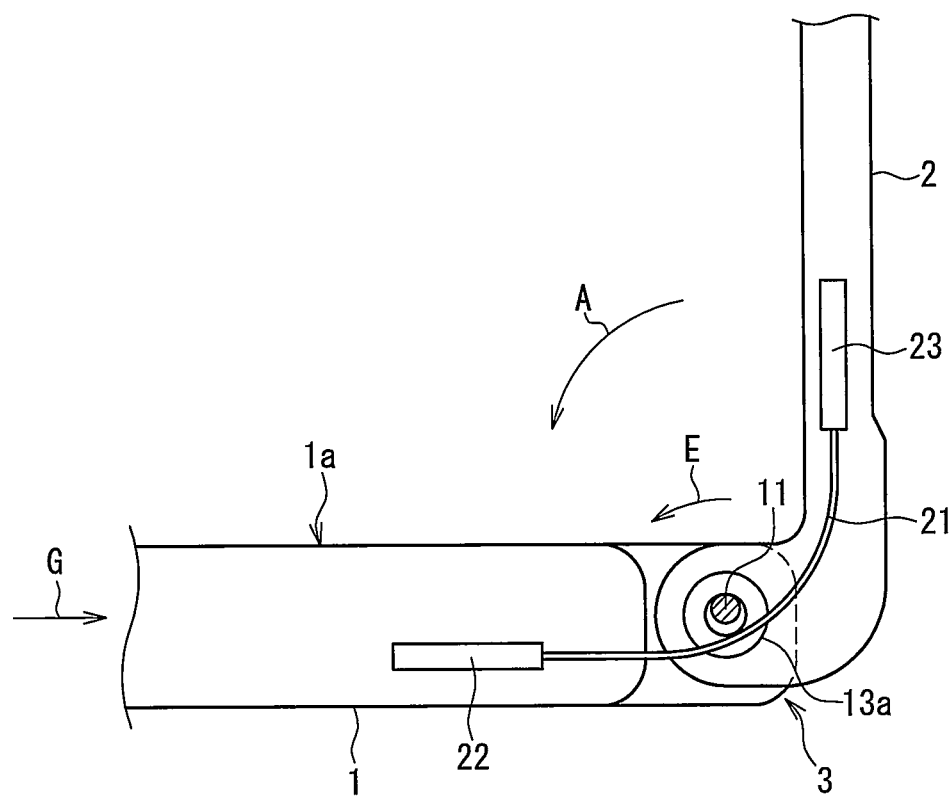
FIG. 5A is a schematic diagram showing the internal configuration of the hinge portion (first state).
Figure 5B:
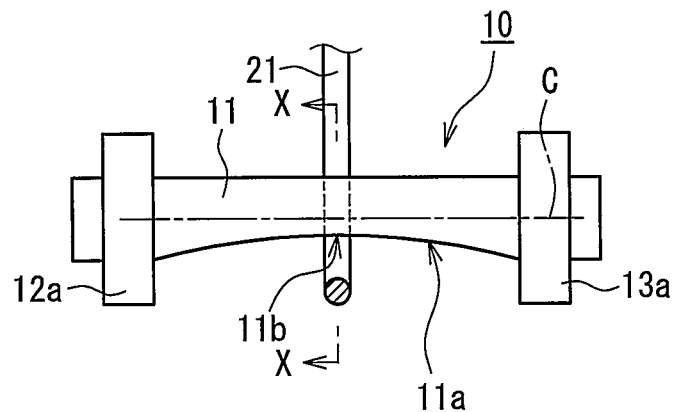
FIG. 5B is a cross-sectional view of the shaft and the cable.
Figure 5C:
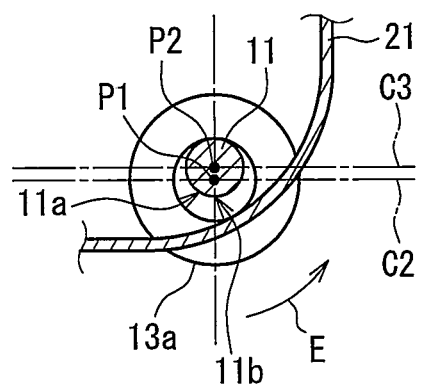
FIG. 5C is a cross-sectional view taken along a line X-X in FIG. 5B.
Figure 6A:
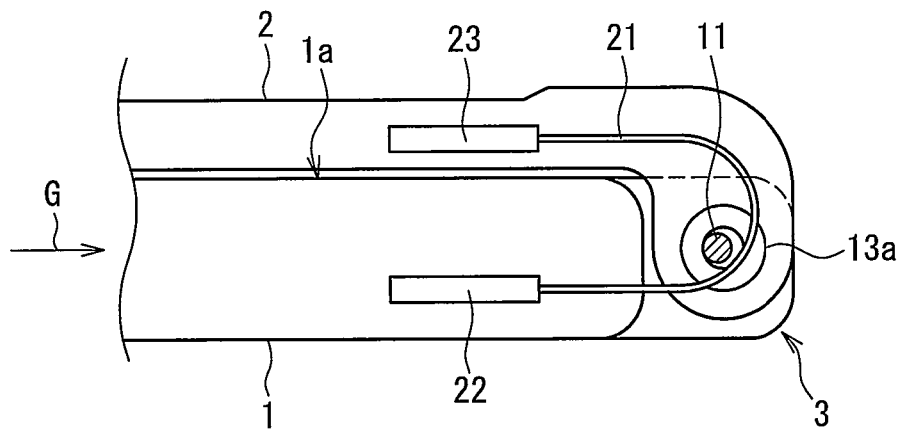
FIG. 6A is a schematic diagram showing the internal configuration of the hinge portion (second state).
Figure 6B:
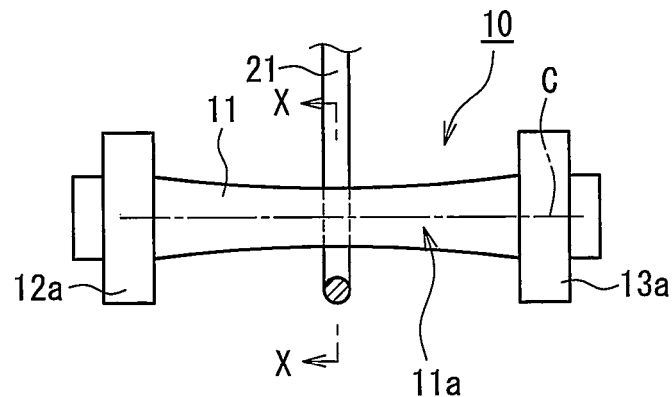
FIG. 6B is a cross-sectional view of the shaft and the cable.
Figure 6C:
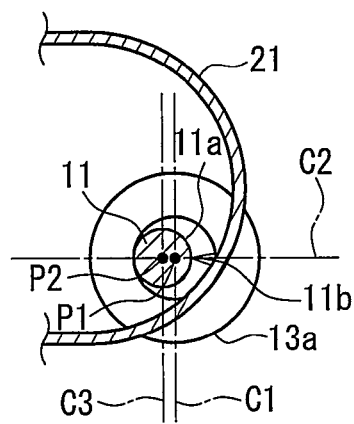
FIG. 6C is a cross-sectional view taken along a line X-X in FIG. 6B.

FIGS. 5A-5C illustrate the first state (see FIG. 1A) of the notebook computer. FIGS. 6A-6C illustrate the second state (see FIG. 1B) of the notebook computer. FIGS. 5A and 6A are schematic diagrams showing the vicinity of the hinge portion 3. FIGS. 5B and 6B are side views showing the vicinity of the shaft 11 in the hinge mechanism 10, viewed in the direction indicated by an arrow G in FIGS. 5A and 6A, respectively. FIGS. 5C and 6C are cross-sectional views taken along a line X-X in FIGS. 5B and 6B, respectively.

First, as shown in FIG. 5A, when the notebook computer is in the first state, since the first connecter 22 is in the plane direction of the upper face 1a and located on the opposite side of the second connector 23 via the shaft 11, a large space is present between the cable 21 and the shaft 11. In the present embodiment, since the center axis of the cylindrical portion 11a of the shaft 11 (intersection P2 in FIG. 5C) is eccentric with respect to the rotation center axis of the shaft 11 (intersection P1 in FIG. 5C), the cylindrical portion 11a is displaced in the direction away from the cable 21. Therefore, a sufficient space can be secured between the shaft 11 and the cable 21, whereby the cable 21 and the shaft 11 do not come into contact with each other and no load is applied to the cable 21.

Next, when the second housing 2 is turned from the first state shown in FIG. 5A in the direction indicated by the arrow A, the position of the second connector 23 also is displaced in the direction indicated by the arrow A. By displacing the second connector 23 together with the second housing 2 in the direction indicated by the arrow A, a part of the cable 21 on the second connector 23 side is displaced in the direction indicated by the arrow A and approaches the shaft 11. At this time, in the present embodiment, since the center axis of the cylindrical portion 11a of the shaft 11 is eccentric with respect to the rotation center axis of the shaft 11, the rotation center axis of the shaft 11 is not displaced but the center axis of the cylindrical portion 11a is displaced in the direction indicated by the arrow E.

Next, as shown in FIG. 6A, when the notebook computer is in the second state, the first connecter 22 and the second connector 23 are positioned in planes that are parallel to the upper face 1a. Thereby the position of the cable 21 is closer to the shaft 11 as compared with the position thereof in the first state.

At this time, in the case where the center axis of the cylindrical portion 11a of the shaft 11 coincides with the rotation center axis of the shaft 11 (when the intersections P1 and P2 coincide with each other), it is highly possible that the shaft 11 and the cable 21 come into contact with each other in the second state. If the shaft 11 and the cable 21 come into contact with each other, the tension of the cable 21 increases, which may break electric wires in the cable 21. Further, if the shaft 11 and the cable 21 come into contact with each other in the second state when the second housing 2 is turned repeatedly, the insulation cover covering the surface of the cable 21 is worn due to the repetitive rubbing therebetween, which may expose the electric wires in the cable 21.

Further, if the cable 21 is in contact with the shaft 11 in the shift from the first state to the second state, the curved portion is pulled in the direction closer to the shaft 11, which increases a tension. At this time, in a configuration in which the rotation center axis of the shaft 11 is not eccentric, the tension applied to the cable 21 increases drastically, which may disconnect the cable 21. In the present embodiment, since the center axis of the cylindrical portion 11a is eccentric with respect to the rotation center axis of the shaft 11, besides, the surface of the shaft 11 is recessed as shown in FIG. 5B and the like, the cable 21 is displaced along the recessed surface of the shaft 11 to the deepest portion 11b when the curved portion of the cable 21 is pulled in the direction closer to the shaft 11. The deepest portion 11b is the portion closest to the rotation center axis of the shaft 11 on the surface of the cylindrical portion 11a, thereby reducing the tension applied to the cable 21 and suppressing the occurrence of disconnections.

In the present embodiment, as shown in FIG. 6C, the center axis of the cylindrical portion 11a of the shaft 11 (intersection P2) is eccentric with respect to the rotation center axis of the shaft 11 (intersection P1). Specifically, the cylindrical portion 11a is positioned eccentrically so that a line segment connecting the intersection P1 and the intersection P2 substantially coincides with the routing direction of the cable 21 with respect to the second connector 23. Therefore, in the second state, the cylindrical portion 11a is displaced in the direction away from the cable 21. Thus, a space can be secured between the shaft 11 and the cable 21, thereby preventing the shaft 11 and the cable 21 from contacting with each other.

Next, when the second housing 2 is turned from the second state shown in FIG. 6A in the direction indicated by the arrow B, the second connector 23 also is displaced in the direction indicated by the arrow B. By displacing the second connector 23 together with the second housing 2 in the direction indicated by the arrow B, the part of the cable 21 on the second connector 23 side is displaced in the direction indicated by the arrow B and moves away from the shaft 11. At this time, in the present embodiment, since the center axis of the cylindrical portion 11a of the shaft 11 is eccentric with respect to the rotation center axis of the shaft 11, the rotation center axis of the shaft 11 is not displaced but the center axis of the cylindrical portion 11a is displaced in the direction indicated by the arrow F. Further, in the second state shown in FIG. 6A, since the shaft 11 and the cable 21 are spaced apart from each other, they do not rub against each other at the time the second housing 2 is turned in the direction indicated by the arrow B. Therefore, the insulation cover of the cable 21 is not worn.

[3. Effects of Embodiment, Etc.]

According to the present embodiment, the center axis of the cylindrical portion 11a of the shaft 11 is eccentric with respect to the rotation center axis of the shaft 11, so that when the cable 21 comes closest to the shaft 11 in the turning of the first housing 1 or the second housing 2, it is possible to secure a sufficient space between the shaft 11 and the cable 21. Therefore, in a turning range of the first housing 1 or the second housing 2, it is highly unlikely that the shaft 11 and the cable 21 come into contact with each other, whereby the increase in the tension of the cable 21 and the wear on the insulation cover of the cable 21 can be avoided. By preventing the increase in the tension of the cable 21, it is possible to prevent the electric wires in the cable 21 from being broken. Further, by preventing the wear on the insulation cover of the cable 21, it is possible to prevent the electric wires covered by the insulation cover from being exposed.

Further, it is unnecessary to make the cable 21 longer for avoiding the shaft 11 and the cable 21 from coming into contact with each other, whereby an internal space of the hinge portion 3 can be made small, and accordingly, the first housing 1, the second housing 2 and the electronic equipment including these can be downsized. In other word, when the cable 21 is long, it is necessary to secure a sufficient space inside the hinge portion 3 for avoiding the cable 21 in its loosest state from contacting with the shaft 11 or other parts. In this case, the electronic equipment is upsized. On the contrary, since the present embodiment has a configuration in which the shaft 11 is displaced, it is unnecessary to make the cable 21 very long, and hence, the internal space of the hinge portion 3 can be made small.

Further, the present embodiment has a configuration in which the first support member 12 and the second support member 13 are connected to the shaft 11, whereby the hinge portion 3 can be downsized. In other words, as shown in FIG. 3A, the hinge mechanism 10 of the present embodiment has a configuration in which the connection between the shaft 11 and the first support member 12 is made at one point and the connection between the shaft 11 and the second support member 13 is made at one point, thereby supporting the first housing 1 and the second housing 2 rotatably. With this configuration, the hinge mechanism 10 and the hinge portion 3 can be downsized, and workability in mounting of the hinge mechanism 10 to the first housing 1 and the second housing 2 is not decreased greatly even if some deformations or the like appear on the components constituting the hinge mechanism 10. For example, in the case where the connection between the shaft and the first support member and the connection between the shaft and the second support member respectively are made at two portions, the hinge mechanism is upsized, and the hinge cover covering the hinge mechanism may protrude from a side portion of the first housing or the second housing. If the hinge cover protrudes from the side portion of the first housing or the second housing, it may be caught by a seam or the like inside a bag when the notebook computer is put in the bag or the like, which may result in dropping or damage to the hinge cover. Further, if the connection between the shaft and the first support member and the connection between the shaft and the second support member respectively are made at two portions, and when deformation or the like appears on the components constituting the hinge mechanism, this causes problems such as difficulty in the mounting of the hinge mechanism to the first housing and the second housing, decline in the production yield, and the like. Furthermore, the mounting of the deformed hinge mechanism to the first housing and the second housing applies a large load on the shaft, the first support member, and the second support member; therefore, it is necessary to increase toughness of the shaft, the first support member and the second support member, which results in an increase in cost.

Note here that in, the present embodiment, the turning movement of the second housing 2 is explained, but the first housing 1 moves in the same manner as the second housing 2 of the present embodiment when being turned, and the same effect can be obtained.

Further, the cable 21 in the present embodiment is the coaxial cable in which electric wires are covered by the insulation cover, but may be a flexible wire cable in which a plurality of electric wires are covered by a cover.

Further, the shaft 11 in the present embodiment can be produced by molding with die, but also can be produce by cutting using a lathe. Incidentally, since the cylindrical portion 11a is eccentric with respect to the rotation center axis of the shaft 11, it is extremely difficult to form it by cutting using the lathe. Therefore, after the shaft 11 is produced by the cutting, the cylindrical portion 11a can be formed in another step using a milling cutter or the like. Further, the cylindrical portion 11a also can be formed by pressing after the production of the shaft 11.

Figure 7A:
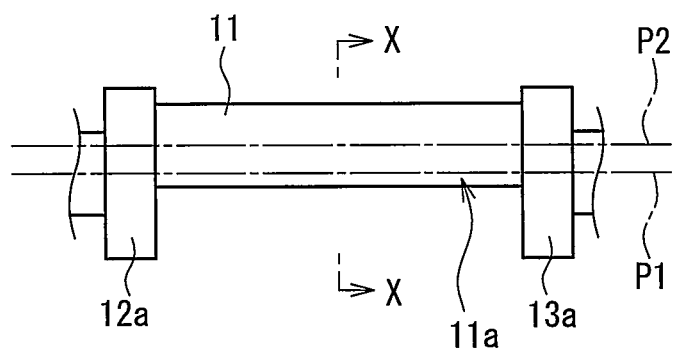
FIG. 7A is a side view showing a modification example of the shaft.
Figure 7B:
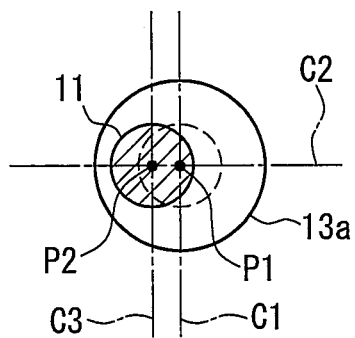
FIG. 7B is a cross-sectional view taken along a line X-X in FIG. 7A.

Further, as shown in FIG. 5B and the like, the shaft 11 in the present embodiment has a curved side surface when viewed from a direction orthogonal with respect to rotation center axis, but is not limited hereto as long as at least a part of the center axis near the cable 21 is eccentric with respect to the rotation center axis of the shaft 11. FIG. 7A is a side view showing a modification example of the shaft 11. FIG. 7B is a cross-sectional view taken along a line X-X in FIG. 7A. Regarding the shaft 11 shown in FIGS. 7A and 7B, the center axis P2 of the cylindrical portion 11a is eccentric with respect to the rotation center axis P1 of the shaft 11. The cylindrical portion 11a has a cylindrical shape. The shaft 11 shown in FIGS. 7A and 7B also can secure a sufficient space between the shaft 11 and the cable 21 when the cable 21 comes closest to the shaft 11 in the turning of the first housing 1 or the second housing 2. Therefore, in the turning range of the first housing 1 or the second housing 2, it is highly unlikely that the shaft 11 and the cable 21 come into contact with each other, whereby the increase in the tension of the cable 21 as well as the wear on the insulation cover of the cable 21 can be prevented. By preventing the increase in the tension of the cable 21, it is possible to avoid breaking the electric wires in the cable 21. Further, by preventing the wear on the insulation cover of the cable 21, it is possible to prevent the electric wires covered by the insulation cover from being exposed.

Note here that in the case of adopting the configuration shown in FIGS. 7A and 7B, the shaft 11 preferably is disposed so that the center axis P2 of the cylindrical portion 11a is positioned within a diameter of the shaft 11. If the shaft 11 is disposed so that the center axis P2 of the cylindrical portion 11a is positioned outside the diameter of the shaft 11, i.e., the shaft 11 is disposed at a position significantly distant from the rotation center axis P1, a force is applied in a direction where the center axis P2 bends or twists with respect to the shaft 11 in the turning the first housing 1 or the second housing 2, which sometimes makes it difficult to turn the first housing 1 or the second housing 2 smoothly. On the contrary, by arranging the shaft 11 such that the center axis P2 of the cylindrical portion 11a is positioned within the diameter of the shaft 11, the force is less likely to be applied in the direction where the center axis P2 bends or twists with respect to the shaft 11 in the turning the first housing 1 or the second housing 2, which allows the first housing 1 or the second housing 2 to turn smoothly.

Figure 8A:
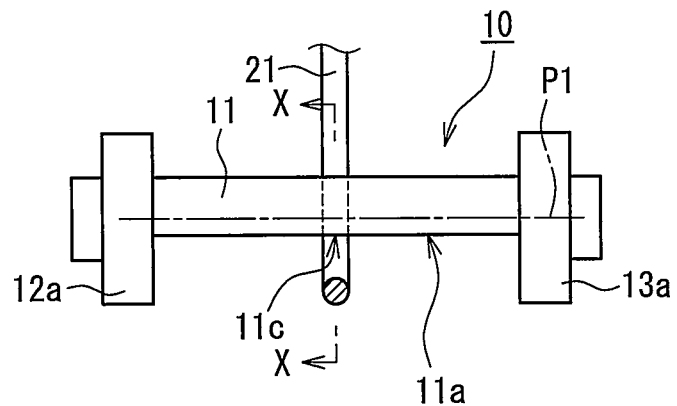
FIG. 8A is a side view of the shaft and the cable with a notched face.
Figure 8B:
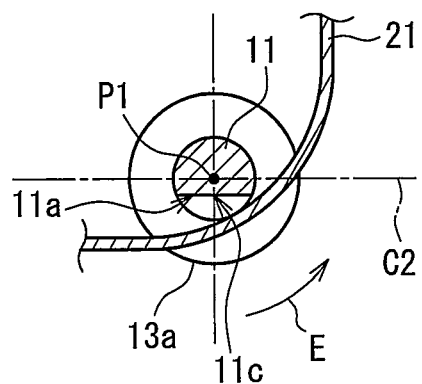
FIG. 8B is a cross-sectional view taken along a line X-X in FIG. 8A.
Figure 8C:
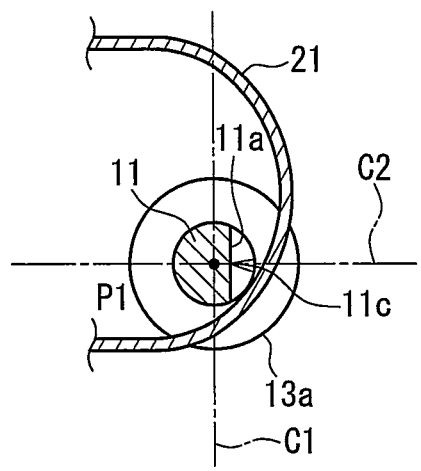
FIG. 8C is a cross-sectional view of the shaft when the notebook computer is in the second state.

Further, the shaft 11 in the present embodiment is circular in cross section as shown in FIG. 4B and the like, but may have a notched face on the cylindrical portion 11a. FIG. 8A is a side view of the vicinity of the shaft 11 having a notched face 11c when viewed from the direction indicated by the arrow G in FIGS. 5A and 6A. FIG. 8B is a cross-sectional view taken along a line X-X in FIG. 8A. FIGS. 8A and 8B show the first state of the notebook computer. FIG. 8C is a cross-sectional view of the shaft 11 and the cable 21 in the second state of the notebook computer. The shaft 11 shown in FIGS. 8A to 8C has the notched face 11c on one side of the cylindrical portion 11a opposite to the second housing 2 via the rotation center axis P1. Further, the shaft 11 rotates about the rotation center axis P1 along with the turning movement of the second housing 2. Accordingly, the notched face 11c is displaced about the rotation center axis P1. The notched face 11c is provided so that a large tension is not applied to the cable 21 in the second state of the notebook computer as shown in FIG. 8C. Specifically, the notched face 11c is provided so as to form a space between the shaft 11 and the cable 21 in the second state of the notebook computer shown in FIG. 8C. Further, the notched face 11c is provided so as not to apply a large tension to the cable 21 even in the case where the shaft 11 and the cable 21 are in contact with each other in the second state of the notebook computer shown in FIG. 8C.

Note here that a part of the shaft 11 between the first support portion 12a and the second support portion 13a shown in FIGS. 8A and 8B entirely is eccentric with respect to the rotation center axis P1, but the shaft 11 is not limited hereto as long as at least a position to which the cable 21 may be opposed is eccentric with respect to the rotation center axis P1. The "position to which the cable 21 may be opposed" is a position to which the cable 21 may be opposed when the first housing 1 or the second housing 2 is turned. In other words, if the cable 21 has flexibility, the cable 21 may be displaced in an axial direction of the rotation center axis P1 when the first housing 1 or the second housing 2 is turned. The "position to which the cable 21 may be opposed" in the present embodiment includes a range in which the cable 21 may be displaced.

Further, the notched face 11c of the shaft 11 shown in FIGS. 8A and 8B is configured to be opposed to the second housing 2, with the rotation center axis P1 sandwiched therebetween. However, the notched face 11c and the second housing 2 are not necessarily disposed in parallel. That is, it is only necessary that the notched face 11c is formed to be opposed to the cable 21. In an example shown in FIG. 8B, the notched face 11c is positioned to be parallel to the line segment C2, but the same effect as that of the present embodiment can be obtained even in the case where the notched face 11c is inclined to be opposed to the curved portion of the cable 21 (e.g., 45° with respect to the line segment C2).

Figure 9A:
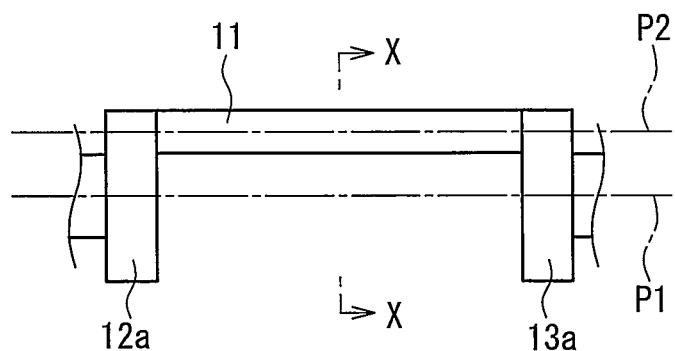
FIG. 9A is a side view showing a modification example of the shaft.
Figure 9B:
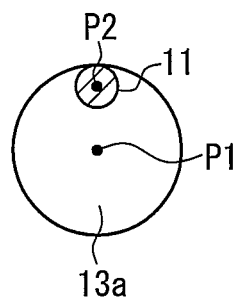
FIG. 9B is a cross-sectional view taken along a line X-X in FIG. 9A.

Further, as shown in FIGS. 9A and 9B, the shaft 11 may be disposed at a position contacting outer circumferences of the first support portion 12a and the second support portion 13a. With this configuration, when the first support portion 12a and the second support portion 13a rotate, the shaft 11 is displaced in a circumferential direction, with the hinge center axis P1 serving as the center. Therefore, when the notebook computer is in the first state shown in FIG. 1A, in the second state shown in FIG. 1B, in the shift from the first state to the second state and vice versa, the cable 21 (see. FIG. 8A and the like) is separated from the shaft 11, whereby the increase in the tension of the cable 21 as well as the wear on the insulation cover of the cable 21 can be avoided. By preventing the increase in the tension of the cable 21, it is possible to avoid breaking the electric wires in the cable 21. Further, by preventing the wear on the insulation cover of the cable 21, it is possible to prevent the electric wires covered by the insulation cover from being exposed.

Figure 10:
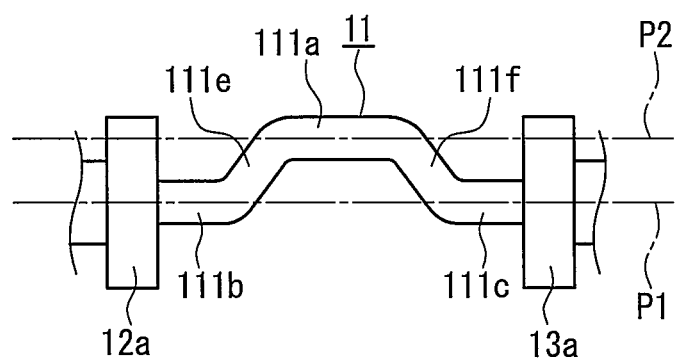
FIG. 10 is a plan view of another shape of the shaft.

Further, the shaft 11 may have a shape shown in FIG. 10. The shaft 11 shown in FIG. 10 includes an eccentric portion 111a, a concentric portion 111b, a concentric portion 111c, an inclined portion 111e and an inclined portion 111f. The center axis P2 of the eccentric portion 111a is eccentric from the hinge center axis P1. The center axis of the concentric portions 111b and 111c coincides with the hinge center axis P1. The inclined portions 111e and 111f are inclined with respect to the hinge center axis P1 or the center axis P2. With this configuration, when the first support portion 12a and the second support portion 13a rotate, the shaft 11 rotates about the hinge center axis P1. When the shaft 11 rotates, the eccentric portion 111a is displaced in the circumferential direction, with the hinge center axis P1 sewing as the center. When the eccentric portion 111a is displaced, the shaft 11 is less likely to come into contact with the cable 21, whereby the wear on the insulation cover of the cable 21 can be avoided. Therefore, during the shift of the notebook computer from the first state to the second state and vice versa, the cable 21 (see FIG. 8A and the like) is separated from the shaft 11, whereby the increase in the tension of the cable 21 as well as the wear on the insulation cover of the cable 21 can be avoided. By preventing the increase in the tension of the cable 21, it is possible to avoid breaking the electric wires in the cable 21. Further, by preventing the wear on the insulation cover of the cable 21, it is possible to prevent the electric wires covered by the insulation cover from being exposed.

Note here that the shape of the shaft 11 shown in FIG. 10 is an example. The eccentric portion 111a has a linear shape, but may have other shapes. The eccentric portion 111a is arranged in a space between the first support portion 12a and the second support portion 13a, but may be arranged outside the space. A length of the eccentric portion 111a in the center axis P2 direction and a length of the concentric portions 111b and 111c in the hinge center axis P1 direction can be set arbitrarily. Connecting portions between the eccentric portion 111a and the inclined portions 111e and 111f are curved, but the curvature can be set arbitrarily. Further, the connecting portions between the eccentric portion 111a and the inclined portions 111e and 111f are curved, but may have an arbitrary shape (bent shape, etc.). A connecting portion between the concentric portion 111b and the inclined portion 111e and a connecting portion between the concentric portion 111c and the inclined portion 111f are curved, but the curvature can be set arbitrarily. The connecting portion between the concentric portion 111b and the inclined portion 111e and the connecting portion between the concentric portion 111c and the inclined portion 111f are curved, but may have an arbitrary shape (bent shape, etc.). As described above, although various shapes can be considered as the shape of the shaft 11, it is necessary that at least the shape does not interfere with the cable 21.

Note here that the shaft 11 may be configured to have a constant diameter and bend in a direction separated from the hinge center axis P1.

Further, the first housing 1 and the second housing 2 in the present embodiment are an example of the housing. The hinge portion 3 in the present embodiment is an example of the hinge portion. The cable 21 in the present embodiment is an example of the signal line. The shaft 11 in the present embodiment is an example of the shaft. The first support portion 12a and the second support portion 13a in the present embodiment are an example of a pair of the support portions.

The electronic equipment of the present application is useful for equipment including a plurality of housings, a hinge portion supporting the plurality of housings rotatably, and a signal line connecting electric components contained in the housings electrically.

What is claimed is:
1. Electronic equipment, comprising:
   a first housing and a second housing respectively provided with electric components;
   a hinge portion that supports the first housing and the second housing rotatably and has a hinge center axis; and
   a signal line that connects the electric components provided in each of the first housing and the second housing electrically,
   wherein the hinge portion has a shaft having an outer cylindrical surface for supporting the first housing and the second housing,
   the signal line is disposed so that a full length of the signal line passes outside of the shaft, and the signal line is spaced outwardly in a radial direction from the outer cylindrical surface of the shaft in the hinge portion, and
   when the second housing is turned, a distance changes between a predetermined point on an outer surface of the first housing and the outer cylindrical surface of the shaft.

2. The electronic equipment according to claim 1,
wherein a part of a center axis of the shaft opposed to the signal line is eccentric with respect to the hinge center axis, and
the outer cylindrical surface is spaced from the signal line when the first housing and the second housing are in a closed state in an open/close movement about the hinge portion.

3. The electronic equipment according to claim 1, wherein the outer cylindrical surface of the shaft has a notched face so as not to cause a tension on the signal line when the first housing and the second housing are in an closed state in the open/close movement about the hinge portion.

4. The electronic equipment according to claim 1, wherein the outer cylindrical surface of the shaft has a notched face so as to allocate a space between the outer cylindrical surface and the signal line when the first housing and the second housing are in the closed state in the open/close movement about the hinge portion.

5. The electronic equipment according to claim 2, wherein, in a part of the shaft near the signal line, the center axis of the eccentric part of the shaft is disposed at a position opposed to the signal line, with the hinge center axis sandwiched therebetween.

6. A hinge mechanism, comprising:
a shaft that supports a first housing and a second housing rotatably; and
a pair of support portions that supports the vicinity of both ends of the shaft and has a hinge center axis,
wherein the shaft has an eccentric portion such that a physical centerline of the shaft does not coincide with a rotation center axis of the hinge mechanism, and having an outer cylindrical surface with respect to the hinge center axis, the shaft being configured so as not to accommodate a signal line within it, and
when the second housing is turned, a distance changes between a predetermined point on an outer surface of the first housing and the outer cylindrical surface of the eccentric portion of the shaft.

* * * * *